(12) United States Patent
Grethel et al.

(10) Patent No.: US 7,234,579 B2
(45) Date of Patent: Jun. 26, 2007

(54) MULTIPLE CLUTCH ASSEMBLY

(75) Inventors: Marco Grethel, Bühlertal (DE);
Manfred Homm, Bühl-Neusatz (DE);
Christoph Vetter, Karlsruhe (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 138 days.

(21) Appl. No.: 11/050,089

(22) Filed: Feb. 3, 2005

(65) Prior Publication Data

US 2005/0194229 A1   Sep. 8, 2005

(30) Foreign Application Priority Data

Feb. 5, 2004   (DE) .................. 10 2004 005 872

(51) Int. Cl.
*F16D 21/06* (2006.01)
(52) U.S. Cl. ................ 192/48.91; 192/87.12; 192/87.16
(58) Field of Classification Search ............ 192/48.91, 192/87.12, 87.13, 87.14, 87.15, 87.18
See application file for complete search history.

(56) References Cited

U.S. PATENT DOCUMENTS

| 2,712,373 | A | 7/1955 | Smirl ............... 192/102 F |
| 6,491,149 | B1 | 12/2002 | Kundermann et al. ..... 192/48.9 |
| 2005/0082136 | A1* | 4/2005 | Braford et al. .......... 192/48.91 |
| 2005/0139442 | A1 | 6/2005 | Agner et al. ............... 192/48.8 |

FOREIGN PATENT DOCUMENTS

| DE | 91 14 528 U1 | 2/1992 |
| DE | 100 04 190 A1 | 4/2001 |
| EP | 1 464 860 A1 | 10/2004 |
| GB | 2 036 203 | 6/1980 |

* cited by examiner

*Primary Examiner*—Saul Rodriguez
(74) *Attorney, Agent, or Firm*—Alfred J. Mangels

(57) ABSTRACT

A multiple clutch assembly for use in the power train of a motor vehicle between a prime mover and a change-speed transmission. A hub is coupled to a pumping device for an operating fluid. The pumping device is located radially outwardly of two coaxial, interfitted input shafts of the transmission. Each of the transmission shafts is associated with a discrete one of two clutches. The placing of the pump radially outwardly of the input shafts of the transmission contributes to simplicity and lower cost of the multiple clutch assembly.

16 Claims, 3 Drawing Sheets

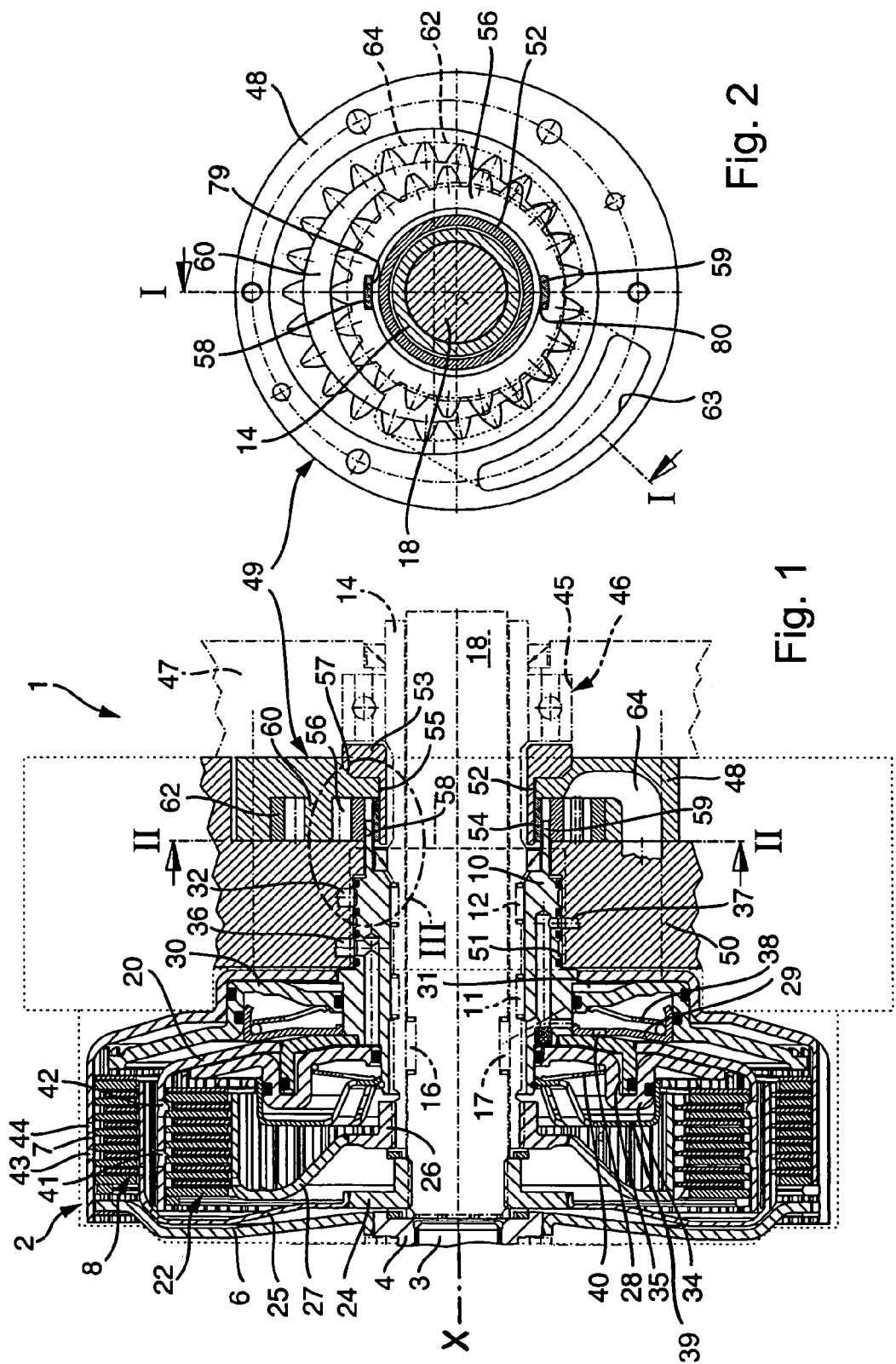

MULTIPLE CLUTCH ASSEMBLY

BACKGROUND OF THE INVENTION

1. Field of the Invention

The invention relates to a multiple clutch assembly or assemblies, especially to improvements in so-called duplex or dual clutches, which can be utilized in the power train of a motor vehicle between the prime mover (such as an internal combustion engine) and the transmission. The clutch assembly has a hub that is coupled to a pump for an operating fluid (e.g., oil). In addition, the clutch assembly has a first clutch associated with a first input shaft of the transmission, and a second clutch associated with a second input shaft of the transmission.

2. Description of the Related Art

A dual or duplex clutch is disclosed in German Patent Publication No. 100 04 190 A1. That clutch also operates in the power train of a motor vehicle and also employs a first clutch which is arranged to transmit torque from the prime mover to a first input shaft of the transmission, and a second clutch which serves to transmit torque between the prime mover and a second input shaft of the transmission. In addition, the known multiple clutch arrangement has a hub which serves as an input element or section and is provided with an internal gear that serves to connect the hub with a drive shaft of a pump. The two transmission input shafts are hollow and receive the drive shaft of the pump. The aforementioned hub of the clutch assembly is coupled to the drive shaft of the pump and is disposed at the side of the clutch assembly that confronts the driving unit.

SUMMARY OF THE INVENTION

An object of the present invention is to provide a relatively simple and inexpensive multiple clutch assembly (particularly a dual or duplex clutch assembly) which is or which can be installed in the power train of a motor vehicle between the prime mover and the change-speed transmission and includes a hub which is coupled to a pump for pumping an operating fluid.

Another object of the invention is to provide a multiple clutch assembly of the just-outlined type which is or which can be installed in the power train of a motor vehicle and includes a first clutch arrangement associated with a first input shaft of the transmission as well as a second clutch arrangement associated with a second input shaft of the transmission.

A further object of the invention is to provide a novel and improved (such as more compact) distribution relative to each other of the components of a multiple clutch assembly and a transmission in the power train of a motor vehicle.

An additional object of the invention is to provide a multiple clutch assembly which is constructed and cooperates with other parts in the power train of a motor vehicle in such a way that the drive shaft for the pump can be dispensed with without unduly affecting the operation, space requirements, and/or other desirable features of the power train and/or its multiple clutch assembly.

An ancillary object of the present invention is to provide an assembly of the above-outlined type wherein one of the transmission input shafts need not constitute a hollow body.

An additional object of the invention is to provide a multiple clutch assembly wherein the pump for operating fluid can be driven directly by the hub of the clutch assembly, and can be installed in close proximity to the clutch assembly with resultant pronounced shortening of the conduits for the flow of operating fluid between the pump and the clutch assembly.

Still another object of the invention is to provide a multiple clutch assembly of the above-outlined type which, or at least certain component parts of which, is and/or are more readily accessible than in presently known multiple clutch assemblies.

A further object of the invention is to provide a novel and improved fluid pump that can be put to use in the above-outlined multiple clutch assembly and can be driven in a novel and improved (especially simpler and less expensive) manner.

Another object of the instant invention is to provide a multiple clutch assembly (such as a dual or duplex assembly) that can be installed in the power train of a motor vehicle in a novel and improved way, e.g., so that it need not employ discrete (independent) bearing means therefor but can be mounted on or in a relatively simple bearing e.g., a bearing of the type known as pedestal bearing.

An additional object of the invention is to provide novel and improved means for reliably and accurately centering the housing of the clutch assembly and/or the transmission case relative to a part of the pedestal bearing.

Another object of the invention is to provide a novel and improved hydraulic regulating arrangement which is disposed between the pump for operating fluid and the clutches of the improved clutch assembly, and which renders it possible to shorten the paths for the flow of operating fluid.

A further object of the present invention is to provide the multiple clutch assembly with novel and improved means for effectively damping shocks which develop and which are transmitted to the clutch assembly when the latter is in actual use.

Another object of the invention is to provide a motor vehicle with a power train which embodies the above-outlined multiple clutch assembly.

An additional object of the present invention is to provide a novel and improved duplex clutch, and another object of this invention is to provide a duplex clutch which constitutes an improvement over and a further development of the duplex clutch disclosed in the aforementioned German Patent Publication No. 100 04 190 A1.

One feature of the present invention resides in the improvements which are embodied in a multiple clutch assembly for use in the power train of a motor vehicle between a rotary output element (e.g., a shaft) of a prime mover (such as an internal combustion engine) and rotary input shafts of a change-speed transmission. One of the improvements includes, in combination, a hub which is rotatable about a predetermined axis (the latter can constitute the axis of the aforementioned rotary output element of the prime mover), a first clutch arrangement which is associated with one of the input shafts, a second clutch arrangement which is associated with the other input shaft, and a pumping device for an operating fluid; this pumping device is coupled to the hub and is located outwardly of the input shafts of the transmission as seen radially of the axis of the hub.

The pumping device can include an internally toothed pump including a gear which is directly coupled to the hub. The latter can include a plurality of drive elements that extend therefrom in the direction of the aforementioned axis, and the gear of the pump can be provided with receptacles for such drive elements. For example, the hub can include at least two substantially tooth-shaped drive elements, and the receptacles can include or constitute sockets for such tooth-shaped drive elements.

Another improvement resides in the provision of a bearing in the form of a pedestal bearing which rotatably mounts the aforementioned gear of the internally toothed pump. The pedestal bearing can be mounted in or on the housing of the pumping device and can include a centering element for such housing.

A further improvement resides in the provision of novel and improved hydraulic control means between the pumping device and the clutch arrangements; such control means can include a plate-like control member having conduits which are arranged to supply an operating fluid to and to convey operating fluid from the pumping device. The control member preferably surrounds at least a portion of the hub, and the improved multiple clutch assembly can further include sealing means between hub and the control member. Such sealing means can include two sealing elements which are spaced from each other (as seen in the direction of the aforementioned axis), and the control member can be provided with at least one fluid-conveying conduit having an outlet between the sealing elements and with at least one first opening which communicates with at least one second opening in the hub.

At least one of the clutch arrangements can include a wet clutch or a disk clutch that is actuatable by operating fluid supplied by the pumping device.

The hub can be designed and mounted to surround at least a portion of one of the input shafts, and the improved assembly can further include a sealing device for the pumping device; such sealing device can be disposed between the one input shaft and the hub. This shaft preferably surrounds the other input shaft of the transmission. The sealing device can include at least one radial shaft seal.

An additional feature of the present invention resides in the provision of a power train that can be utilized in a motor vehicle between a rotary output element of a prime mover and rotary input shafts of a transmission. The power train includes a hub which is rotatable about a predetermined axis, a first clutch arrangement which is associated with one of the input shafts, a second clutch arrangement which is associated with another input shaft, and a pumping device for an operating fluid; the pumping device is coupled to the hub and is located outwardly of the shafts as seen radially of the predetermined axis.

The power train can further include a torsional vibration damper that operates between the prime mover and at least one of the clutch arrangements. The first clutch arrangement can surround the second clutch arrangement or vice versa.

BRIEF DESCRIPTION OF THE DRAWINGS

The novel features of the invention are set forth in particular in the appended claims. The improved multiple clutch assembly itself, however, both as to its construction and the modes of assembling and operating the same, together with numerous additional important and advantageous features and attributes thereof, will be best understood upon consideration of the following detailed description of certain presently preferred specific embodiments with reference to the accompanying drawings, in which:

FIG. 1 is a partly schematic axial sectional view of a dual or duplex clutch assembly which embodies one form of the present invention, the section being taken in the direction of the arrows as viewed along the line I—I of FIG. 2;

FIG. 2 is a transverse sectional view of the duplex clutch assembly as viewed in the direction of the arrows along the line II—II of FIG. 1;

DESCRIPTION OF THE PREFERRED EMBODIMENTS

Figure 3:
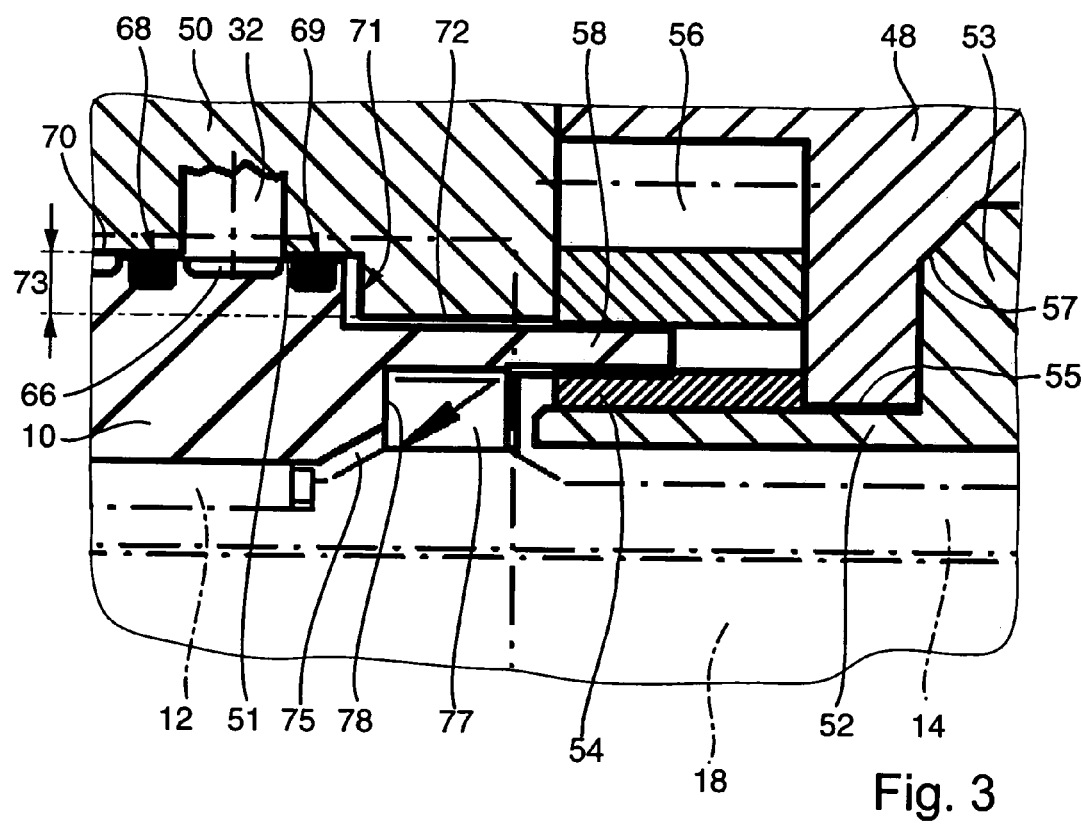
FIG. 3 is a greatly enlarged view of a detail within the oval designated III of the section shown in FIG. 1.

Referring first to FIGS. 1 to 3, there is shown a portion of a power train 1 of a motor vehicle, e.g., a passenger car. This power train includes a prime mover (such as an internal combustion engine) having an output shaft 3 which is coaxial with and is outwardly surrounded by a dual or duplex or twin clutch 2, which can be engaged to transmit torque to the hollow first input shaft 14 and/or to the solid second input shaft 18 of a change-speed transmission further having a case or housing 47 (indicated in FIG. 1 by dot-dash lines).

The output shaft 3 of the prime mover is provided with an annular array of external teeth (not shown) mating with internal teeth provided in an input element 4 of the dual clutch 2. This input element 4 resembles a hub or carrier and is welded (i.e., non-rotatably connected) to a radially inner portion of a sheet-metal carrier 6 in order to transmit torque between the input element 4 and an outer disk holder or carrier 7 forming part of a first disk clutch arrangement or assembly 8 (hereinafter also called first clutch for the sake of brevity). The right-hand portion (as seen in FIG. 1) of the outer disk carrier 7 extends radially in a direction toward the transmission or gearing of the power train 1 and is welded to a hub 10.

The transmission of the power train 1 includes a hollow cylindrical first transmission input shaft 14 (see also FIG. 2) which carries external needle bearings 11, 12 rotatably mounting the hub 10. A solid, second transmission input shaft 18 is rotatably mounted in needle bearings 16, 17 that are confined in the hollow outer transmission shaft 14. The common axis of the output shaft 3 of the prime mover, of the input element 4, and the output shafts 14, 18 of the transmission, is shown in FIG. 1 (as at X).

A second (outer) disk carrier 20 forming part of a second clutch arrangement or assembly 22 is non-rotatably affixed to and surrounds the hub 10. The second clutch arrangement 22 includes a set of disks that are surrounded by an annular set of disks forming part of the first (radially outer) clutch arrangement or clutch 8. The disk carriers 7 and 20 are non-rotatably connected to each other by the hub 10 and can receive torque from the output shaft 3 of the prime mover by way of the aforementioned sheet metal carrier 6. The normal power flow between the prime mover including the output shaft 3 and the input shafts 14, 18 of the transmission takes place by way of the outer disk carriers or holders 7, 20, which constitute the input components of the respective clutch arrangements or clutches 8 and 22.

The inner disks of the first clutch arrangement 8 are non-rotatably borne by a carrier 25 having a hub 24. Analogously, the radially outer transmission input shaft 14 is non-rotatably connected to the hub of an inner disk carrier 27 forming part of the second disk clutch 22 by suitable keyways, splines, or the like. The transmission of regulating torque from the prime mover toward the transmission including the coaxial interfitted input shafts 14, 18 takes place in such a way that the inner disk carriers 25 and 27 respectively constitute the outputs of the first and second clutches 8 and 22.

The dual clutch 2 further includes integrated actuation pistons that serve to actuate the disks of the respective clutches 8 and 22. In the embodiment of FIGS. 1 to 3, such pistons serve to engage the respective clutches 8 and 22. The first clutch 8 includes an actuation piston 20 which is installed axially between the radially extending section of the outer disk carrier 7 of the clutch 8 and the radially extending section of the outer disk carrier 20 of the second clutch 22; this piston is movable in the direction of the axis X along the outer disk carrier 7 and along the hub 10 with the interposition of suitable sealing elements, which are shown but not referenced in FIG. 1.

A pressure chamber 31 is provided between the outer disk carrier 7 and the piston 30 of the first clutch 8, and a centrifugal-force-operated sheet-metal pressure equalizing or compensating plate 29 is installed between the piston 30 and the outer disk carrier 20. This pressure equalizing plate bounds a centrifugal-force-operated pressure equalizing or compensating chamber. An outlet (e.g., a bore) 28 for fluid is provided in the radially inner portion of the sheet-metal pressure equalizing device 29.

The pressure chamber 31 communicates with the internal gear pump 49 by way of a conduit 32. A piston 34 is axially movably installed between the carrier 20 for the outer disks of the second clutch 22 and the carrier 27 for the inner disks of the clutch 22. A pressure chamber 35 between the carrier 20 for the outer disks of the clutch 22 serves to initiate and control the movements of the piston 34 of the clutch 22; this pressure chamber is connected with the pump 49 by way of a conduit 36 for pressurized fluid. The conduits 32 and 36 are disposed radially outwardly of the hub 10 and are located diametrically opposite a conduit 37 for fluid coolant; this coolant-conveying conduit is also disposed radially outwardly of the hub 10.

During normal operation of the power train 1, the pressure chambers 31 and 35 are completely filled with a fluid (e.g., oil). If the fluid pressure in these chambers rises, the clutches 8, 22 are actuated by the respective pistons 30, 34, against the restoring spring force of diaphragm springs 38, 40. The coolant flows in the conduit 37 to the clutches in order to withdraw a certain amount of heat that develops when the power train 1 is in use. Openings 41, 42, 43 and 44 in the outer disk carriers 20 and 7 serve to permit evacuation of spent coolant.

The numeral 46 denotes a radial bearing for the transmission input shaft 14; this bearing is disposed (a) at that end of the shaft 14 which is spaced apart from the dual clutch 2 and (b) in the housing or case 47 of the transmission. The transmission case 47 carries the housing 48 of the pump 49, which latter preferably constitutes an internal gear pump. A plate-like control means 50 is installed between the pump housing 48 and the radially inner portion of the outer disk carrier 7 in the dual clutch 2; this control arrangement has a throughbore or hole 51 for fluid coolant; this coolant-conveying conduit is also disposed radially outwardly of the hub 10.

As seen in FIGS. 1 and 3, the housing 48 of the internal gear pump 49 is provided with a centrally located throughbore or hole 55 which includes a larger-diameter ledge 57 toward the transmission. A bearing 52, preferably a bearing of the type known as a pedestal bearing, is press fit in the bore or opening 55 of the pump housing 48; this pedestal bearing is provided with a collar-shaped centering element or flange 53 which abuts the surface bounding the ledge 57 of the bore 55 in the pump housing 48. The purpose of the ledge 57 is to facilitate the assembling of the dual clutch 2, namely during installation of the pedestal bearing 52.

The flange 53 projects beyond that surface of the pump housing 48 which confronts the transmission including the input shafts 14 and 18. The part of the flange 53 which projects beyond the aforementioned surface of the pump housing 48 is received in a recess or socket 45 of the pump housing 48; this recess or socket further receives a radial bearing 46. The element or flange 53 of the pedestal bearing 52 can center the pump 49 and the plate-like control means 50, and preferably also the hub 10, relative to the housing portion 47 of the transmission.

A sleeve-like slide bearing 54 is installed radially outwardly of the pedestal bearing 52 and serves to rotatably mount the pump pinion 56 of the internally toothed pumping device 49 on the pedestal bearing 52. As best seen in FIG. 2, the pockets, or sockets 79, 80 for the drive elements 58, 59 of the hub 10 are provided in the pump pinion 56. In the embodiment of FIGS. 1 to 3, the drive elements 58, 59 resemble fingers and are of one piece with the hub 10; their purpose is to drive the pump pinion 56, i.e., to transmit torque from the hub 10 to the pump pinion 56.

Instead of being a press fit in the bore 55 of the pump housing 48, the pedestal bearing 52 can be omitted and the pump pinion 56 is then mounted directly on the hub 10.

The numerals 38 and 40 denote diaphragm springs which respectively react against the pistons 30, 34 and bear against the plates 29, 39.

The pump housing 48 contains a fixedly-mounted, crescent-shaped member 60 which is located radially outwardly of the pump pinion 56 and radially inwardly of a pump internal gear 62. The latter mates with the pump pinion 56 at a locus diametrically opposite the crescent-shaped member 60. When the pump pinion 56 and the internal gear 62 (which latter mates with the pump pinion 56) are driven to rotate clockwise (as viewed in FIG. 2), the pump 49 causes an operating fluid (e.g., oil) in the space between the pump pinion 56 and the internal gear 62 to flow in the region of a suction opening 63 and is pressurized at a pressure region 64. The thus-pressurized fluid flows in conduits (not shown) which are provided in the plate-like control means 50 and through adjustable valves which permit pressurized fluid to flow into the conduits 32, 36; these conduits are also provided in the control means 50.

As can be seen in enlarged form in FIG. 3, the conduit 32 of the control means 50 discharges into a ring-shaped opening 66, which can constitute a groove and is provided in the radially outer portion of the hub 10. When the improved power train 1 is in use, the hub 10 rotates relative to the stationary control means 50. The radially inner end of the conduit 32 in the control means 50 and the corresponding ring-shaped opening 66 together define a transfer zone wherein the pressurized fluid flows from the control means 50 into the hub 10. This transfer zone is sealed, to prevent uncontrolled leakage of pressurized fluid, by suitable sealing elements 68, 69 which are provided laterally of the ring-shaped opening 66 and can constitute mechanical rotating or floating ring seals abutting the control means 50. FIG. 1 shows that the transfer zones between the plate-like control means 50 and the hub 10 are disposed at the radially inner ends of the conduits 36 (for pressurized fluid) and 37 (for fluid coolant).

The centrally located opening, which extends through the plate-like control means 50, includes a section 70 that has an opening or offset 71 extending radially of the axis X and separating the section 70 from a smaller-diameter radially inner section 72. The difference 73 between the radii of the sections 70 and 72 is shown in FIG. 3. The finger-like drive elements 58, 59 extend radially inwardly from the radially inner section 72 and their outer diameters match the diameter of this inner section.

The control means 50 serves to operate the clutches 8 and 22 and, to this end, includes the aforementioned valves. These clutches preferably include sets of cooperating disks.

The reference numeral 75 in FIG. 3 denotes a radially inner clearance or gap between the hub 10 and the transmission input shaft 14. The width of this clearance can vary as a function of operating conditions. In order to prevent undesirable penetration of air via clearance 75 when the pumping means 49 is in use, the power train 1 of FIGS. 1 to 3 further includes an undulate radial seal 77 in that portion of the clearance 75 which is nearer to the transmission including the input shafts 14 and 18. A portion of this radial seal is received in a cylindrical recess 78 provided in that side or face of the hub 10 that faces the transmission including the shafts 14 and 18.

The pumping device 49 is located at that (front) side of the control means 50 that confronts the transmission. This results in the following distribution of certain component parts of the improved power train 1: The hydraulic control means 50 is disposed between the transmission (including the input shafts 14 and 18) and the dual clutch 2, and the pumping device 49 is located between the control means 50 and the transmission. Such distribution of the just-enumerated constituents of the improved power train results in the advantage that the conduits that are provided in the control means 50, as well as the conduits in the hub 10, are relatively short. The admission and evacuation of fluid take place directly through the control means 50 of the hydraulic fluid flow regulating means. The required fluid conveying means (such as conduits, holes, grooves, and the like) are fully integrated into the novel control means.

Important advantages of the improved power train 1 include its simplicity and low cost. This is attributable, at least to a certain extent, to the novel mounting of the pump 49, namely radially outwardly of the input shafts 14, 18 of the transmission, and to the fact that the connection between the pump 49 and the hub 10 is also disposed radially outwardly of the shafts 14, 18. Such an arrangement renders it possible to dispense with a conventional input shaft for the pump.

Another important advantage of the improved power train 1 is that one (18) of the transmission input shafts 14, 18 can constitute a solid body that is received in the hollow cylindrical shaft 14. Furthermore, the pump 49 can receive torque directly from the hub 10 and can be installed in close proximity to the dual clutch 2. This results in a shortening of the paths for the flow of fluid to and from the pump 49, particularly between the pump and the dual clutch 2. It is preferred to install the pump 49 at that side of the dual clutch 2 which faces the transmission including the input shafts 14 and 18.

An important advantage of the feature that the pump 49 is an internal gear pump, as well as that the pump pinion 56 of the pump 49 is or can be directly coupled to the hub 10, is that this renders it possible to dispense with any other means for driving the rotary part or parts of the pump. In addition, it is not necessary to provide fully independent bearing means for the pump 49.

The feature that the hub 10 carries several (such as two) drive elements (58, 59), which extend radially of and can be of one piece with the hub and are received in complementary receptacles 79, 80 of the pump pinion 56 of the pump 49, also contributes to the simplicity and compactness of the improved power train. However, it is also within the purview of the present invention to replace the drive elements 58, 59 and the receptacles 79, 80 with other suitable torque transmitting means, e.g., with shaft-hub connectors which employ shafts having gear teeth or the like.

Figure 4:
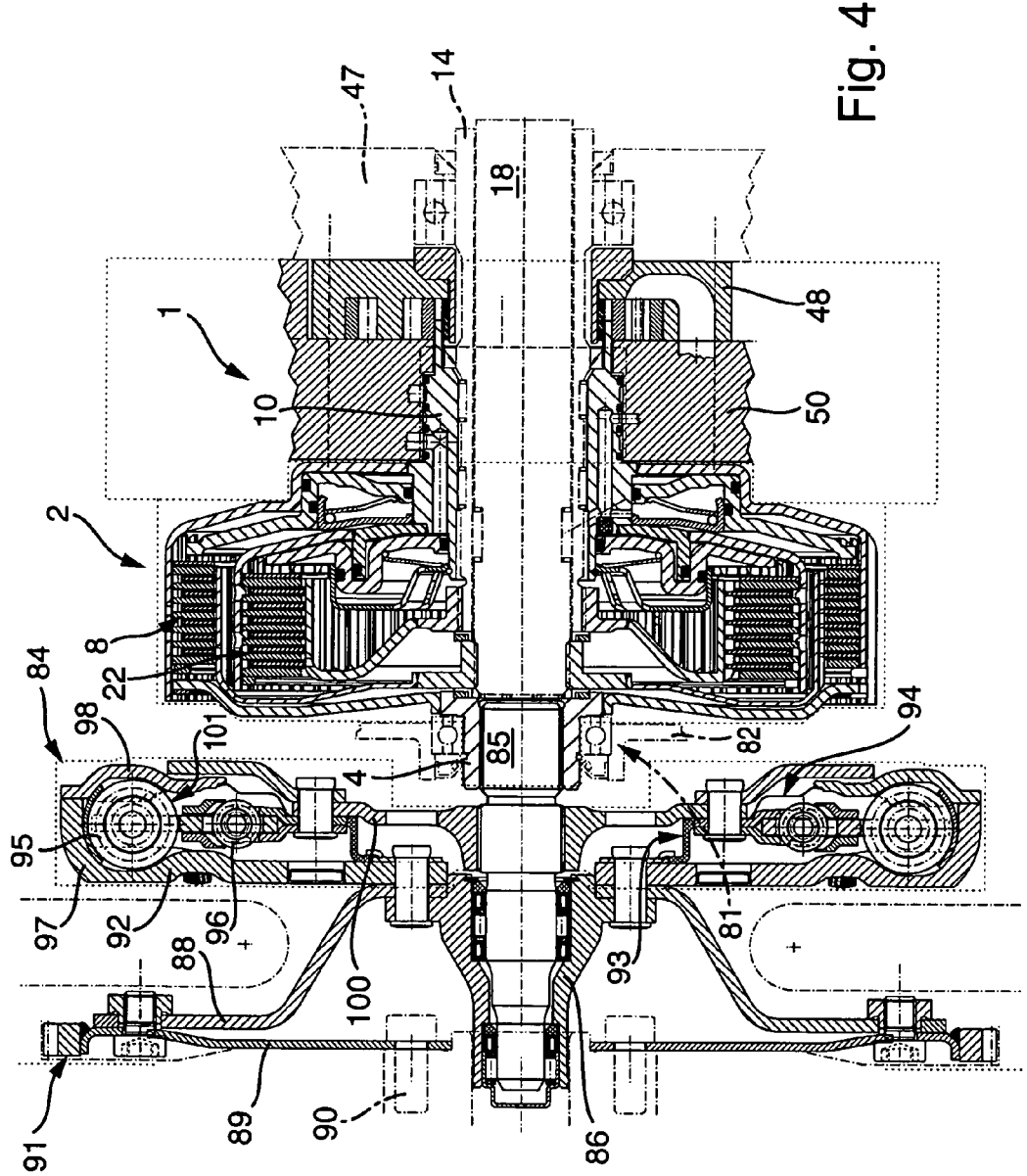
FIG. 4 is an axial sectional view similar to that of FIG. 1 but showing certain features of a modified duplex clutch assembly in accordance with the present invention.

FIG. 4 illustrates the relevant details of a modified power train 1. All such parts of this power train which are identical with or clearly analogous to the corresponding parts of the power train 1 of FIGS. 1 to 3 are denoted by reference numerals corresponding to those shown in FIGS. 1 to 3 and will be described only to the extent which is necessary for a full understanding of the construction and mode of operation of the modified power train.

An important feature of the power train 1 of FIG. 4 is the provision of a torsional vibration damper 84, which operates between the prime mover (not shown) and the dual clutch 2. The input element 4 of the dual clutch 2 shown in FIG. 4 is rotatably mounted in a bearing 81 that is installed in the clutch housing 82. The latter is or can be secured to the section 47 of the transmission case. The torsional vibration damper 84 includes an output element 85 which is non-rotatably connected with the input element 4 of the dual clutch 2, e.g., by means of a gear having teeth on the input element 4. The torsional vibration damper 84 further includes an input element 86, which resembles or constitutes a hub and is guided and centered relative to the output shaft of the prime mover (e.g., relative to the crankshaft or camshaft of an internal combustion engine, not shown).

The reference numeral 90 in FIG. 4 denotes one of several threaded bolts or analogous fasteners which serve to secure the adjacent portion of the output element (not shown) of the prime mover to a sheet- or plate-like carrier 89 (often called flex-sheet or plate-like). The radially outermost portion of the carrier 89 mounts a starter gear 91. Screws, rivets, or other suitable fasteners are provided to secure the radially outer portion of the carrier 89 to a support 88, which can consist of sheet metal, and that serves as a plate-like driver. Additional screws or analogous fasteners are employed to non-rotatably affix the support 88 to a primary mass 92 of the torsional vibration damper 84.

A secondary mass 94 of the damper 84 is rotatably supported by the primary mass 92 with the interposition of a bearing 93. The primary mass 92 can drive the secondary mass 94 by way of a damper 101 having two compressible energy storing elements 95, 96. The illustrated energy storing elements 95, 96 constitute elongated arcuate coil springs that are radially spaced from each other, each of which can be compressed or can expand through a great distance, and which are received in chambers preferably containing supplies of a viscous medium. These chambers are defined by sheet metal walls 97, 98.

The output element 85 of the torsional vibration damper 84 is rigid or integral with a flange-like member 100, the radially outermost portion of which has arms alternating with the end portions of the compressible energy storing elements 95, 96. These elements extend circumferentially of the damper 84 and are compressed when the flange-like member 100 and the primary mass 92 of the damper are caused to turn relative to each other.

An advantage of the power train of FIG. 4 is that the damper 84 prevents the transmission of pronounced shocks and/or other stresses from the prime mover (norm-ally or often an internal combustion engine) to the clutches 8, 22 and the transmission including the shafts 14, 18.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above-described contribution to the art of multiple clutch assemblies for use in the power trains of motor vehicles, and therefore such adaptations should and are intended to be comprehended within the meaning and range of equivalence of the appended claims.

What is claimed is:

1. A multiple clutch assembly for use in a power train of a motor vehicle between a rotary output element of a prime mover and rotary input shafts of a change-speed transmission, the clutch assembly comprising:
    a hub rotatable about a predetermined axis;
    a first clutch arrangement operatively coupled with a first transmission input shaft;
    a second clutch arrangement operatively coupled with a second transmission input shaft, wherein at least one of the clutch arrangements includes a wet clutch; and
    a pumping device for pumping an operating fluid, wherein the pumping device is operatively coupled to the hub and surrounds each of the transmission input shafts.

2. The multiple clutch assembly of claim 1, wherein the pumping device includes an internal gear pump.

3. The multiple clutch assembly of claim 2, wherein the pumping device includes a pump pinion directly coupled to the hub.

4. The multiple clutch assembly of claim 3, wherein the hub includes a plurality of drive elements extending axially therefrom relative to an input shaft axis, wherein the pump pinion includes receptacles for receiving the drive elements.

5. The multiple clutch assembly of claim 4, wherein the hub includes two at least substantially tooth-shaped drive elements and the receptacles include sockets for receiving the tooth-shaped drive elements.

6. The multiple clutch assembly of claim 2, wherein the pumping device includes a pump pinion directly coupled to the hub and further includes a pedestal bearing rotatably supporting the pump pinion, the pumping device further including a housing that receives the pedestal bearing.

7. The multiple clutch assembly of claim 6, wherein the pedestal bearing serves as a centering element for the housing of the pumping device.

8. The multiple clutch assembly of claim 1, further including hydraulic control means positioned between the pumping device and the first and second clutch arrangements.

9. The multiple clutch assembly of claim 8, wherein the hydraulic control means includes a plate-shaped control member having conduits arranged to supply an operating fluid to and to convey operating fluid from the pumping device.

10. The multiple clutch assembly of claim 9, wherein the control member surrounds at least a portion of the hub and further includes sealing means between the hub and the control member.

11. The multiple clutch assembly of claim 10, wherein the sealing means includes two sealing elements which are spaced from each other in the direction of the axis, the control member including at least one fluid-conveying conduit having an outlet between the sealing elements.

12. The multiple clutch assembly of claim 9, wherein the control member includes at least one first opening communicating with at least one second opening in the hub.

13. The multiple clutch assembly of claim 1, wherein at least one of the clutch arrangements includes a disk clutch actuatable by fluid supplied by the pumping device.

14. The multiple clutch assembly of claim 10, wherein the sealing means includes at least one radial shaft seal.

15. A power train for use in a motor vehicle between a rotary output element of a prime mover and rotary input shafts of a transmission, the power train comprising:
    a hub rotatable about a predetermined axis;
    a first clutch arrangement operatively coupled with one of the transmission input shafts;
    a second clutch arrangement operatively coupled with another of the transmission input shafts;
    a torsional vibration damper positioned between the prime mover and at least one of the first and second clutch arrangements; and
    a pumping device for pumping an operating fluid and operatively coupled to the hub having an operating fluid chamber positioned radially outwardly of the shafts.

16. A power train for use in a motor vehicle between a rotary output element of a prime mover and rotary input shafts of a transmission, the power train comprising:
    a hub rotatable about a predetermined axis;
    a first clutch arrangement operatively coupled with one of the transmission input shafts;
    a second clutch arrangement operatively coupled with another of the transmission input shafts, wherein one of the clutch arrangements surrounds the other clutch arrangement; and
    a pumping device for pumping an operating fluid and operatively coupled to the hub having an operating fluid chamber positioned radially outwardly of the shafts.

* * * * *